United States Patent
Chang et al.

(10) Patent No.: US 11,337,264 B2
(45) Date of Patent: May 17, 2022

(54) COMMUNICATION METHOD AND COMMUNICATIONS APPARATUS

(71) Applicant: Huawei Technologies Co., Ltd., Shenzhen (CN)

(72) Inventors: Junren Chang, Beijing (CN); Jiwu Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 16/831,106

(22) Filed: Mar. 26, 2020

(65) Prior Publication Data

US 2020/0229254 A1 Jul. 16, 2020

Related U.S. Application Data

(63) Continuation of application No. PCT/CN2018/105165, filed on Sep. 12, 2018.

(30) Foreign Application Priority Data

Sep. 27, 2017 (CN) .......................... 201710890691.0

(51) Int. Cl.
*H04W 76/15* (2018.01)
*H04W 76/27* (2018.01)
(Continued)

(52) U.S. Cl.
CPC ............. *H04W 76/15* (2018.02); *H04W 8/24* (2013.01); *H04W 24/10* (2013.01);
(Continued)

(58) Field of Classification Search
CPC ..... H04W 76/15; H04W 76/27; H04W 76/16; H04W 8/24; H04W 8/10; H04W 24/10;
(Continued)

(56) References Cited

U.S. PATENT DOCUMENTS

2012/0178448 A1* 7/2012 Yuk ........................ H04W 88/06
455/435.1
2018/0368016 A1* 12/2018 Lee ....................... H04B 17/318

FOREIGN PATENT DOCUMENTS

WO 2016195617 A1 12/2016
WO 2017123045 A1 7/2017

OTHER PUBLICATIONS

Nokia, Alcatel-Lucent; On NR/LTE Dual connectivity deployment options and what Service Indication the UE shall display; Jun. 26-30, 2017; SA WG2 Meeting #122; S2-174603; pp. 1-2 (Year: 2017).*

(Continued)

*Primary Examiner* — Farid Seyedvosoghi
(74) *Attorney, Agent, or Firm* — Slater Matsil, LLP

(57) ABSTRACT

This application provides a communication method and a communications apparatus. The method includes: receiving, by a terminal device, control information sent by a first network device, where the control information is used to indicate information about a second network device, the second network device and the first network device use different radio access technologies, the terminal device camps on a cell of the first network device, and a cell of the second network device does not support camping of the terminal device or does not support initial access of the terminal device; and displaying, by the terminal device, a first sign based on the control information, where the first sign is a sign corresponding to a radio access technology used by the second network device.

12 Claims, 6 Drawing Sheets

(51) Int. Cl.
*H04W 8/24* (2009.01)
*H04W 24/10* (2009.01)
*H04W 72/04* (2009.01)

(52) U.S. Cl.
CPC ..... *H04W 72/042* (2013.01); *H04W 72/0453* (2013.01); *H04W 76/27* (2018.02)

(58) Field of Classification Search
CPC ............... H04W 24/02; H04W 72/042; H04W 72/0453; H04W 48/16; H04W 48/12; H04W 88/06
See application file for complete search history.

(56) References Cited

OTHER PUBLICATIONS

NEC; 3GPP TSG-RAN WG2 #99, R2-1708228; AS support for 5G indication; Berlin, Germany, Aug. 21-25, 2017; pp. 1-4 (Year: 2017).*
NEC, "AS support for 5G indication," 3GPP TSG-RAN WG2 #99; R2-1708228, Berlin, Germany, Aug. 21-25, 2017, 4 pages.
Nokia et al., "On NR/LTE Dual connectivity deployment options and what Service Indication the UE shall display," SA NG2 Meeting #122, S2-174603, San Jose del Cabo, Mexico, Jun. 26-30, 2017, 2 pages.
Huawei et al., "LTE-NR tight interworking control plane," 3GPP TSG-RAN WG2 Meeting #94, R2-164268, Nanjing, China, May 23-27, 2016, 4 pages.
3GPP TS 37.340 V0.2.1 (Aug. 2017), 3rd Generation Partnership Project; Technical Specification Group Radio Access Network, "Evolved Universal Terrestrial Radio Access (E-UTRA) and NR; ulti-connectivity; Stage 2 (Release 15)", Aug. 2017, 43 pages.
Intel Corporation, "RRC Connection Reconfiguration for EN-DC operation", 3GPP TSG-RAN WG2 Meeting NR Ad-hoc#2, R2-1707047, Qingdao, China, May 15-19, 2017, 8 pages.
3GPP TS 38.331 V0.0.5 (Aug. 2017), 3rd Generation Partnership Project; Technical Specification Group Radio Access Network; NR; Radio Resource Control (RRC); Protocol specification (Release 15), Aug. 2019, 38 pages.
Ericsson, "System information handling in EN-DC", 3GPP TSG-RAN WG2 NR#2, Tdoc, R2-1706580 ,Qingdao, China, Jun. 27-29, 2017, 3 pages.
Vodafone, "5G Availability Indicator", 3GPP TSG-RAN WG2 Meeting#98, R2-1708574, Berlin, Germany, Aug. 21-25, 2017, 2 Pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/105165, filed on Sep. 12, 2018, which claims priority to Chinese Patent Application No. 201710890691.0, filed on Sep. 27, 2017. The disclosures of the aforementioned applications are hereby incorporated by reference in their entireties.

TECHNICAL FIELD

This application relates to the communications field, and in particular, to a communication method and a communications apparatus in the communications field.

BACKGROUND

To increase a transmission rate of a wireless network to enhance user experience, the 3rd Generation Partnership Project (3GPP) organization is discussing a standard, to be specific, a fifth generation (5G) mobile communications technology standard, for a next generation wireless communications technology new radio (NR). In the first phase of 5G standardization work, a long term evolution (LTE)-based 5G technology, to be specific, LTE-NR dual connectivity (LTE-NR DC), is mainly to be developed.

A base station in an LTE system is referred to as an eNB. A base station in an NR system is referred to as a gNB. In an LTE-NR DC scenario, the LTE eNB has a larger coverage area but has a smaller quantity of resources, while the NR gNB has a smaller coverage area but has a larger quantity of high-frequency carriers. Therefore, generally, the LTE eNB is used as a master base station (master eNB, MeNB), and the NR gNB is used as a secondary base station (secondary gNB). The MeNB may have a plurality of cells. One of the plurality of cells may be selected as a primary cell (PCell) to provide a service for a terminal device, and another cell may be used as a secondary cell (SCell). Each cell of the SgNB is generally used as an SCell to provide a service for a terminal device. In addition, in the LTE-NR DC scenario, the SgNB cannot directly access a core network. Therefore, a cell of the NR gNB is usually inaccessible, and the NR gNB needs to work with the LTE eNB. Because the gNB cannot directly access the core network, a terminal device cannot camp on the cell of the gNB.

In the LTE-NR DC scenario, indication information is usually added to an LTE system information block (SIB), to indicate a terminal device that a current network supports LTE-NR DC, so that the terminal device displays an NR sign (or a 5G sign) once detecting the indication information in the SIB. However, that the current network supports LTE-NR DC does not take effect for all terminal devices in the network. Because the SIB is broadcast by an LTE eNB, a terminal device that does not support LTE-NR DC may display the NR sign.

SUMMARY

This application provides a communication method and a communications apparatus, to help improve accuracy of displaying a sign of a radio access technology by a terminal device.

According to a first aspect, a communication method is provided and includes: receiving, by a terminal device, control information sent by a first network device, where the control information is used to indicate information about a second network device, the second network device and the first network device use different radio access technologies, the terminal device camps on a cell of the first network device, and a cell of the second network device does not support camping of the terminal device or does not support initial access of the terminal device; and displaying, by the terminal device, a first sign based on the control information, where the first sign is a sign corresponding to a radio access technology used by the second network device.

Specifically, the first network device and the second network device use different radio access technologies, and the terminal device can camp on the cell of the first network device, but cannot camp on the cell of the second network device or cannot access the cell of the second network device. In this case, the first network device may send the terminal device the control information used to indicate the information about the second network device. The terminal device receives the control information, and displays, based on the control information, the first sign corresponding to the radio access technology used by the second network device.

It should be understood that, the first network device may be an LTE network device, for example, an eNB, and the second network device may be an NR network device, for example, a gNB. Correspondingly, the cell of the first network device may be an LTE cell, and the cell of the second network device may be an NR cell. This is not limited in this embodiment of this application. It should be further understood that, the first sign may be a 5G sign, or may be an NR sign. This is not limited in this embodiment of this application, either.

In the communication method in this embodiment of this application, the first network device sends the terminal device the control information used to indicate the information about the second network device, so that the terminal device can display, based on the control information, the sign corresponding to the radio access technology used by the second network device. This improves accuracy of displaying the sign of the radio access technology by the terminal device, thereby improving user satisfaction.

With reference to the first aspect, in some implementations of the first aspect, the control information is NR frequency information of the second network device or NR cell information of the second network device, the NR frequency information is used to indicate an NR frequency that can be used by the second network device to provide a service with the first network device in a long term evolution-new radio dual connectivity LTE-NR DC mode, and the NR cell information is used to indicate an NR cell that can be used by the second network device to provide a service with the first network device in the LTE-NR DC mode; and the displaying, by the terminal device, a first sign based on the control information includes: displaying, by the terminal device, the first sign based on the NR frequency information or the NR cell information; or displaying, by the terminal device, the first sign based on a capability of the terminal device and the NR frequency information or the NR cell information.

Specifically, the control information may be the NR frequency information of the second network device or the NR cell information of the second network device. In other words, the first network device may notify the terminal device of the NR frequency or the NR cell that can be provided for the terminal device. After receiving the NR frequency information or the NR cell information, the terminal device may directly display the first sign, or may determine whether to display the first sign and display the first sign when determining to display the first sign. In other words, the terminal device may display the first sign based on the NR frequency information or the NR cell information, or the terminal device may display the first sign based on the capability of the terminal device and the NR frequency information or the NR cell information. This is not limited in this embodiment of this application.

It should be understood that, the NR frequency information may include frequency configuration information, reference signal configuration information, and the like. The NR frequency indicated by the NR frequency information may correspond to one or more NR cells. This is not limited in this embodiment of this application. The NR cell information may include frequency information of the NR cell, and may further include cell identification information of the NR cell, reference signal configuration information of the NR cell, and the like. This is not limited in this embodiment of this application, either.

With reference to the first aspect, in some implementations of the first aspect, the displaying, by the terminal device, the first sign based on a capability of the terminal device and the NR frequency information or the NR cell information includes: displaying, by the terminal device, the first sign when the capability of the terminal device supports the NR frequency or the NR cell; or displaying, by the terminal device, the first sign when the capability of the terminal device supports operating in the LTE-NR DC mode by using the NR frequency or the NR cell.

Specifically, the terminal device may first determine the capability of the terminal device, to be specific, a frequency that the terminal device can support, and determine whether the terminal device can support the NR frequency or the NR cell. If the terminal device cannot support the NR frequency indicated by the NR frequency information sent by the first network device, or cannot support the NR cell indicated by the NR cell information sent by the first network device (which may be specifically that the terminal device does not support a frequency of the NR cell), the terminal device may not display the first sign. In other words, the terminal device displays the first sign only when the capability of the terminal device supports the NR frequency indicated by the NR frequency information or the capability of the terminal device supports the NR cell indicated by the NR cell information. This improves accuracy of displaying the first sign by the terminal device, thereby improving user satisfaction.

Optionally, after determining the capability of the terminal device, the terminal device may further determine whether the capability of the terminal device supports both an LTE frequency and the NR frequency, to be specific, determine whether the capability of the terminal device supports the LTE-NR DC mode using the NR frequency. If the terminal device cannot support operating in the LTE-NR DC mode by using the NR frequency, the terminal device may not display the first sign. In other words, the terminal device displays the first sign only when the capability of the terminal device supports operating in the LTE-NR DC mode by using the NR frequency. This improves accuracy of displaying the first sign by the terminal device, thereby improving user satisfaction. Optionally, after determining the capability of the terminal device, the terminal device may further determine whether the capability of the terminal device supports both an LTE frequency and a frequency of the NR cell indicated by the NR cell information. If the terminal device cannot support operating in the LTE-NR DC mode by using the NR cell, the terminal device may not display the first sign. In other words, the terminal device displays the first sign only when the capability of the terminal device supports operating in the LTE-NR DC mode by using the NR cell. This improves accuracy of displaying the first sign by the terminal device, thereby improving user satisfaction.

With reference to the first aspect, in some implementations of the first aspect, the displaying, by the terminal device, the first sign based on the NR frequency information or the NR cell information includes: performing, by the terminal device, signal measurement on the NR frequency or the NR cell based on the NR frequency information or the NR cell information; and displaying, by the terminal device, the first sign based on a measurement result of the signal measurement.

Specifically, the terminal device may obtain, based on the NR frequency information, the NR frequency corresponding to the NR frequency information, or may obtain, based on the NR cell information, the NR cell corresponding to the NR cell information, perform signal measurement on the NR frequency or the NR cell, and display the first sign based on the measurement result of the signal measurement on the NR frequency or the NR cell.

With reference to the first aspect, in some implementations of the first aspect, the displaying, by the terminal device, the first sign based on a measurement result of the signal measurement includes: displaying, by the terminal device, the first sign when the terminal device can detect a signal of the NR frequency or the NR cell; or displaying, by the terminal device, the first sign when the terminal device can detect a signal of the NR frequency or the NR cell and quality of the signal of the NR frequency or the NR cell is greater than a first threshold.

It should be understood that, the first threshold may be determined by the terminal device, or may be pre-configured by the first network device for the terminal device. For example, the first network device adds the first threshold to system information sent to the terminal device. Alternatively, when sending the NR frequency information or the NR cell information to the terminal device, the first network device also sends the first threshold to the terminal device. This is not limited in this embodiment of this application.

With reference to the first aspect, in some implementations of the first aspect, the displaying, by the terminal device, the first sign based on a measurement result of the signal measurement includes: displaying, by the terminal device, the first sign based on the measurement result of the signal measurement and the capability of the terminal device.

Specifically, after performing the signal measurement on the NR frequency indicated by the NR frequency information or the NR cell indicated by the NR cell information, the terminal device may further determine, based on the measurement result of the signal measurement and the capability of the terminal device, whether to display the first sign, and display the first sign when determining to display the first sign.

With reference to the first aspect, in some implementations of the first aspect, the displaying, by the terminal device, the first sign based on the measurement result of the signal measurement and the capability of the terminal device includes: displaying, by the terminal device, the first sign when the terminal device can detect a signal of the NR frequency or the NR cell and the capability of the terminal device supports operating in the LTE-NR DC mode by using the NR frequency or the NR cell; or displaying, by the terminal device, the first sign when the terminal device can detect a signal of the NR frequency or the NR cell, quality of the signal of the NR frequency or the NR cell is greater than a first threshold, and the capability of the terminal device supports operating in the LTE-NR DC mode by using the NR frequency or the NR cell.

Specifically, the terminal device may determine whether the signal of the NR frequency or the NR cell can be detected, and determine whether the capability of the terminal device can support operating in the LTE-NR DC mode by using the NR frequency or the NR cell. If the terminal device can detect the signal of the NR frequency or the NR cell and the capability of the terminal device can support operating in the LTE-NR DC mode by using the NR frequency or the NR cell, the terminal device displays the first sign. This improves accuracy of displaying the first sign by the terminal device, thereby improving user satisfaction. Optionally, after detecting the signal of the NR frequency or the NR cell, the terminal device may further determine whether the quality of the signal of the NR frequency or the NR cell is greater than the first threshold. If the quality of the signal of the NR frequency or the NR cell is greater than the first threshold and the capability of the terminal device supports operating in the LTE-NR DC mode by using the NR frequency or the NR cell, the terminal device displays the first sign. This improves accuracy of displaying the first sign by the terminal device, thereby improving user satisfaction.

With reference to the first aspect, in some implementations of the first aspect, the control information is carried in system information SI.

With reference to the first aspect, in some implementations of the first aspect, the control information is first instruction information, the first instruction information is used to instruct the terminal device to display the first sign, and the control information is carried in any one of the following messages: a random access response message, a random access contention resolution message, a radio resource control RRC connection establishment message, an RRC connection re-establishment message, an RRC connection resume message, and an RRC connection reconfiguration message.

It should be understood that, the first network device may explicitly instruct the terminal device to display the first sign, or may implicitly instruct the terminal device to display the first sign. To be specific, the first instruction information may be specifically one indicator bit. For example, 1 is used to instruct to display the first sign, and 0 is used to instruct not to display the first sign. Alternatively, the first instruction information may be specifically other information, for example, NR frequency information or NR cell information, of the second network device. After detecting such information, the terminal device may display the first sign. Therefore, the explicit instruction and the implicit instruction are not limited in this embodiment of this application.

With reference to the first aspect, in some implementations of the first aspect, the first instruction information is NR cell information of the second network device, and the NR cell information is used to indicate an NR cell that can be used by the second network device to provide a service with the first network device in an LTE-NR DC mode.

With reference to the first aspect, in some implementations of the first aspect, the control information is carried in the RRC connection reconfiguration message, and the RRC connection reconfiguration message is used to set the NR cell as an NR secondary cell of the terminal device in the LTE-NR DC mode.

Specifically, the first network device may send the RRC connection reconfiguration message to the terminal device, and the RRC connection reconfiguration message carries the NR cell information. After receiving the RRC connection reconfiguration message, the terminal device sets, based on the NR cell information, the NR cell indicated by the NR cell information as the NR secondary cell of the terminal device in the LTE-NR DC mode, and displays the first sign.

With reference to the first aspect, in some implementations of the first aspect, the first sign is a 5G sign or an NR sign.

According to a second aspect, another communication method is provided and includes: determining, by a first network device, control information, where the control information is used to indicate information about a second network device, the second network device and the first network device use different radio access technologies, a terminal device camps on a cell of the first network device, and a cell of the second network device does not support camping of the terminal device or does not support initial access of the terminal device; and sending, by the first network device, the control information to the terminal device.

In the communication method in this embodiment of this application, the first network device sends the terminal device the control information used to indicate the information about the second network device, so that the terminal device can display, based on the control information, a sign corresponding to a radio access technology used by the second network device. This improves accuracy of displaying the sign of the radio access technology by the terminal device, thereby improving user satisfaction.

With reference to the second aspect, in some implementations of the second aspect, the control information is NR frequency information of the second network device or NR cell information of the second network device, the NR frequency information is used to indicate an NR frequency that can be used by the second network device to provide a service with the first network device in a long term evolution-new radio dual connectivity LTE-NR DC mode, and the NR cell information is used to indicate an NR cell that can be used by the second network device to provide a service with the first network device in the LTE-NR DC mode.

With reference to the second aspect, in some implementations of the second aspect, the control information is carried in system information SI.

With reference to the second aspect, in some implementations of the second aspect, the control information is first instruction information, the first instruction information is used to instruct the terminal device to display a first sign corresponding to a radio access technology used by the second network device, and the control information is carried in any one of the following messages: a random access response message, a random access contention resolution message, a radio resource control RRC connection establishment message, an RRC connection re-establishment message, an RRC connection resume message, and an RRC connection reconfiguration message; and before the sending, by the first network device, the control information to the terminal device, the method further includes: determining, by the first network device, that a service can be provided for the terminal device in an LTE-NR DC mode.

With reference to the second aspect, in some implementations of the second aspect, the first instruction information is NR cell information of the second network device, and the NR cell information is used to indicate an NR cell that can be used by the second network device to provide a service with the first network device in the LTE-NR DC mode.

With reference to the second aspect, in some implementations of the second aspect, the control information is carried in the RRC connection reconfiguration message, and the RRC connection reconfiguration message is used to set the NR cell as an NR secondary cell of the terminal device in the LTE-NR DC mode.

With reference to the second aspect, in some implementations of the second aspect, the determining, by the first network device, that a service can be provided for the terminal device in an LTE-NR DC mode includes: determining, by the first network device based on at least one piece of the following information, that the service can be provided for the terminal device in the LTE-NR DC mode: service information of the terminal device, bearer information of the terminal device, location information of the terminal device, signal measurement information of the terminal device, and capability information of the terminal device.

With reference to the second aspect, in some implementations of the second aspect, the first sign is a 5G sign or an NR sign.

According to a third aspect, a communications apparatus is provided and configured to perform the method in the first aspect or any possible implementation of the first aspect. Specifically, the apparatus includes a unit configured to perform the method in the first aspect or any possible implementation of the first aspect.

According to a fourth aspect, another communications apparatus is provided and configured to perform the method in the second aspect or any possible implementation of the second aspect. Specifically, the apparatus includes a unit configured to perform the method in the second aspect or any possible implementation of the second aspect.

According to a fifth aspect, another communications apparatus is provided. The apparatus includes: a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the following steps: receiving, by using the transceiver, control information sent by a first network device, where the control information is used to indicate information about a second network device, the second network device and the first network device use different radio access technologies, the apparatus camps on a cell of the first network device, and a cell of the second network device does not support camping of the apparatus or does not support initial access of the apparatus; and displaying a first sign based on the control information, where the first sign is a sign corresponding to a radio access technology used by the second network device.

With reference to the fifth aspect, in some implementations of the fifth aspect, the control information is NR frequency information of the second network device or NR cell information of the second network device, the NR frequency information is used to indicate an NR frequency that can be used by the second network device to provide a service with the first network device in a long term evolution-new radio dual connectivity LTE-NR DC mode, and the NR cell information is used to indicate an NR cell that can be used by the second network device to provide a service with the first network device in the LTE-NR DC mode; and the processor is specifically configured to: display the first sign based on the NR frequency information or the NR cell information; or display the first sign based on a capability of the apparatus and the NR frequency information or the NR cell information.

With reference to the fifth aspect, in some implementations of the fifth aspect, the processor is specifically configured to: display the first sign when the capability of the apparatus supports the NR frequency or the NR cell; or display the first sign when the capability of the apparatus supports operating in the LTE-NR DC mode by using the NR frequency or the NR cell.

With reference to the fifth aspect, in some implementations of the fifth aspect, the processor is specifically configured to: perform signal measurement on the NR frequency or the NR cell based on the NR frequency information or the NR cell information; and display the first sign based on a measurement result of the signal measurement.

With reference to the fifth aspect, in some implementations of the fifth aspect, the processor is specifically configured to: display the first sign when a signal of the NR frequency or the NR cell can be detected; or display the first sign when a signal of the NR frequency or the NR cell can be detected and quality of the signal of the NR frequency or the NR cell is greater than a first threshold.

With reference to the fifth aspect, in some implementations of the fifth aspect, the processor is specifically configured to: display the first sign based on the measurement result of the signal measurement and the capability of the apparatus.

With reference to the fifth aspect, in some implementations of the fifth aspect, the processor is specifically configured to: display the first sign when a signal of the NR frequency or the NR cell can be detected and the capability of the apparatus supports operating in the LTE-NR DC mode by using the NR frequency or the NR cell; or display the first sign when a signal of the NR frequency or the NR cell can be detected, quality of the signal of the NR frequency or the NR cell is greater than a first threshold, and the capability of the apparatus supports operating in the LTE-NR DC mode by using the NR frequency or the NR cell.

With reference to the fifth aspect, in some implementations of the fifth aspect, the control information is carried in system information SI.

With reference to the fifth aspect, in some implementations of the fifth aspect, the control information is first instruction information, the first instruction information is used to instruct the apparatus to display the first sign, and the control information is carried in any one of the following messages: a random access response message, a random access contention resolution message, a radio resource control RRC connection establishment message, an RRC connection re-establishment message, an RRC connection resume message, and an RRC connection reconfiguration message.

With reference to the fifth aspect, in some implementations of the fifth aspect, the first instruction information is NR cell information of the second network device, and the NR cell information is used to indicate an NR cell that can be used by the second network device to provide a service with the first network device in an LTE-NR DC mode.

With reference to the fifth aspect, in some implementations of the fifth aspect, the control information is carried in the RRC connection reconfiguration message, and the RRC connection reconfiguration message is used to set the NR cell as an NR secondary cell of the apparatus in the LTE-NR DC mode.

With reference to the fifth aspect, in some implementations of the fifth aspect, the first sign is a 5G sign or an NR sign.

According to a sixth aspect, another communications apparatus is provided. The apparatus includes: a transceiver, a memory, and a processor. The transceiver, the memory, and the processor communicate with each other through an internal connection channel. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the following steps: determining control information, where the control information is used to indicate information about a second network device, the second network device and the apparatus use different radio access technologies, a terminal device camps on a cell of the apparatus, and a cell of the second network device does not support camping of the terminal device or does not support initial access of the terminal device; and sending, by using the transceiver, the control information to the terminal device.

With reference to the sixth aspect, in some implementations of the sixth aspect, the control information is NR frequency information of the second network device or NR cell information of the second network device, the NR frequency information is used to indicate an NR frequency that can be used by the second network device to provide a service with the apparatus in a long term evolution-new radio dual connectivity LTE-NR DC mode, and the NR cell information is used to indicate an NR cell that can be used by the second network device to provide a service with the apparatus in the LTE-NR DC mode.

With reference to the sixth aspect, in some implementations of the sixth aspect, the control information is carried in system information SI.

With reference to the sixth aspect, in some implementations of the sixth aspect, the control information is first instruction information, the first instruction information is used to instruct the terminal device to display a first sign corresponding to a radio access technology used by the second network device, and the control information is carried in any one of the following messages: a random access response message, a random access contention resolution message, a radio resource control RRC connection establishment message, an RRC connection re-establishment message, an RRC connection resume message, and an RRC connection reconfiguration message; and the processor is further configured to: before the control information is sent to the terminal device, determine that a service can be provided for the terminal device in an LTE-NR DC mode.

With reference to the sixth aspect, in some implementations of the sixth aspect, the first instruction information is NR cell information of the second network device, and the NR cell information is used to indicate an NR cell that can be used by the second network device to provide a service with the apparatus in the LTE-NR DC mode.

With reference to the sixth aspect, in some implementations of the sixth aspect, the control information is carried in the RRC connection reconfiguration message, and the RRC connection reconfiguration message is used to set the NR cell as an NR secondary cell of the terminal device in the LTE-NR DC mode.

With reference to the sixth aspect, in some implementations of the sixth aspect, the processor is specifically configured to: determine, based on at least one piece of the following information, that the service can be provided for the terminal device in the LTE-NR DC mode: service information of the terminal device, bearer information of the terminal device, location information of the terminal device, signal measurement information of the terminal device, and capability information of the terminal device.

With reference to the sixth aspect, in some implementations of the sixth aspect, the first sign is a 5G sign or an NR sign.

According to a seventh aspect, a communications system is provided. The system includes the terminal device in the third aspect or any possible implementation of the third aspect and the network device in the fourth aspect or any possible implementation of the fourth aspect.

Alternatively, the system includes the terminal device in the fifth aspect or any possible implementation of the fifth aspect and the network device in the sixth aspect or any possible implementation of the sixth aspect.

According to an eighth aspect, a computer program product is provided. The computer program product includes computer program code. When the computer program code is run by a terminal device, the terminal device is enabled to perform the method in the first aspect or any possible implementation of the first aspect.

According to a ninth aspect, a computer program product is provided. The computer program product includes computer program code. When the computer program code is run by a network device, the network device is enabled to perform the method in the second aspect or any possible implementation of the second aspect.

According to a tenth aspect, this application provides a chip, including: an input interface, an output interface, at least one processor, and a memory. The input interface, the output interface, the processor, and the memory are connected through an internal connection channel. The processor is configured to execute code in the memory. When the code is executed, the processor is configured to perform the method in the first aspect or any possible implementation of the first aspect.

According to an eleventh aspect, this application provides a chip, including: an input interface, an output interface, at least one processor, and a memory. The input interface, the output interface, the processor, and the memory are connected through an internal connection channel. The processor is configured to execute code in the memory. When the code is executed, the processor is configured to perform the method in the second aspect or any possible implementation of the second aspect.

According to a twelfth aspect, a computer-readable medium is provided and configured to store a computer program. The computer program includes an instruction used to perform the method in the first aspect or any possible implementation of the first aspect.

According to a thirteenth aspect, a computer-readable medium is provided and configured to store a computer program. The computer program includes an instruction used to perform the method in the second aspect or any possible implementation of the second aspect.

DETAILED DESCRIPTION OF ILLUSTRATIVE EMBODIMENTS

The following describes technical solutions of this application with reference to accompanying drawings.

Figure 1:
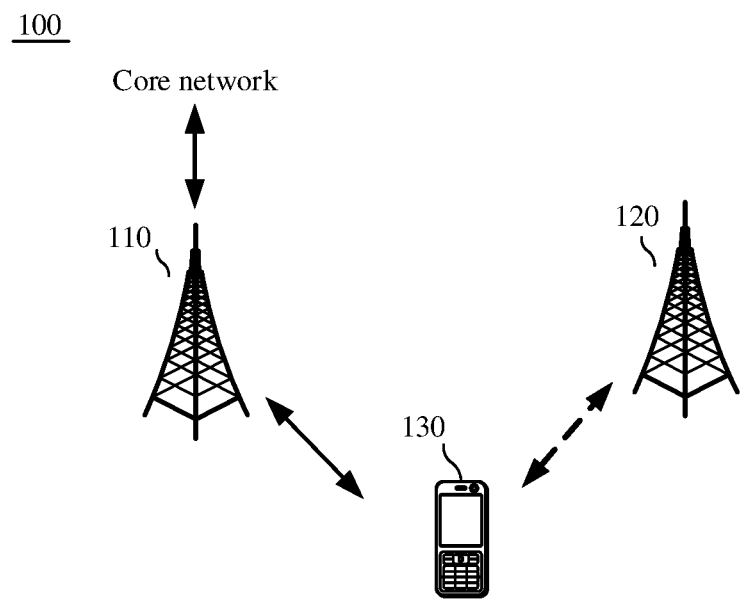
FIG. 1 is a schematic diagram of a communications system according to an embodiment of this application.

FIG. 1 shows a communications system 100 to which an embodiment of this application is applied. The communications system 100 may include at least two network devices: a first network device 110 and a second network device 120. The first network device 110 and the second network device 120 each may be a device communicating with a terminal device, for example, a base station or a base station controller. Each network device can provide communication coverage for a particular geographic area, and can communicate with a terminal device (for example, UE) within the coverage area (a cell). In the at least two network devices, the first network device 110 and the second network device 120 use different radio access technologies. Specifically, the first network device 110 may be an evolved NodeB (eNB or eNodeB) in an LTE system, and the second network device 120 may be a base station gNB in a 5G system.

The wireless communications system 100 further includes at least one terminal device 130 located in a coverage area of the first network device 110. The terminal device 130 may be mobile or fixed. The terminal device 130 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless telephone set, a session initiation protocol (SIP) phone, a wireless local loop (WLL) station, a personal digital assistant (PDA), a handheld device having a wireless communications function, a computing device, another processing device connected to a wireless modem, an in-vehicle device, a wearable device, a terminal device in a future 5G network, a terminal device in a future evolved public land mobile network (PLMN), or the like.

In an LTE-NR DC scenario, the first network device has a larger coverage area but has a smaller quantity of resources, while the second network device has a smaller coverage area but has a larger quantity of high-frequency carriers. Therefore, in an example that the first network device is an eNB and the second network device is a gNB, the eNB may be used as a master base station (master eNB, MeNB), and the gNB may be used as a secondary base station (secondary gNB). The MeNB may have a plurality of cells. One of the plurality of cells may be selected as a primary cell (PCell) to provide a service for a terminal device, and another cell may be used as a secondary cell (SCell). Each cell of the SgNB is generally used as an SCell to provide a service for a terminal device. In addition, in the LTE-NR DC scenario, the SgNB cannot directly access a core network. Therefore, a cell of the gNB is usually inaccessible, and the gNB needs to work with the eNB. Because the gNB cannot directly access the core network, a terminal device cannot camp on the cell of the gNB.

FIG. 1 shows two network devices and one terminal device for example. Optionally, the communications system 100 may include a plurality of network devices, and a coverage area of each network device may include another quantity of terminal devices. This is not limited in the embodiment of this application.

Optionally, the wireless communications system 100 may further include other network entities such as a network controller and a mobility management entity. The embodiment of this application is not limited thereto.

Figure 2:
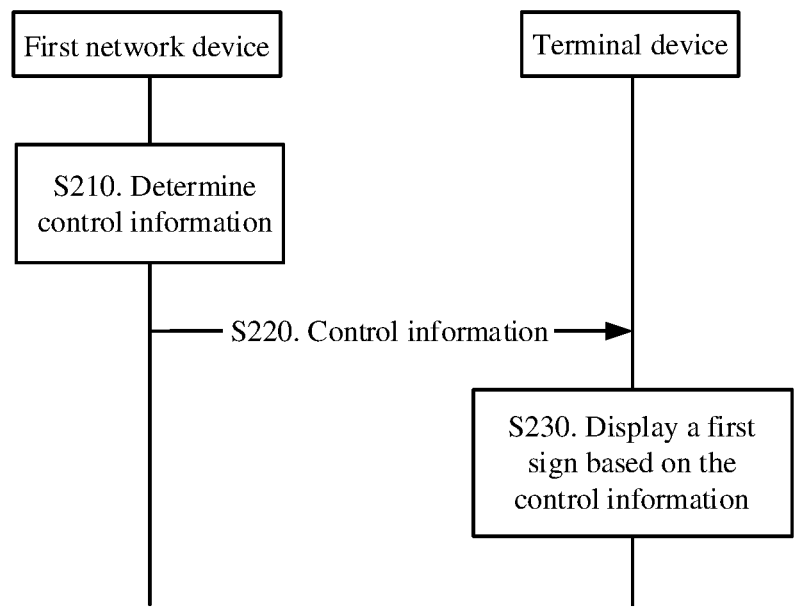
FIG. 2 is a schematic flowchart of a communication method according to an embodiment of this application.

FIG. 2 is a schematic flowchart of a communication method 200 according to an embodiment of this application. The method 200 may be applied to the communications system 100 shown in FIG. 1, but this embodiment of this application is not limited thereto.

S210. A first network device determines control information, where the control information is used to indicate information about a second network device, the second network device and the first network device use different radio access technologies, a terminal device camps on a cell of the first network device, and a cell of the second network device does not support camping of the terminal device or does not support initial access of the terminal device.

Specifically, that the terminal device camps on a cell means that the terminal device has selected a cell through a cell selection or reselection process, and listens to system information and a paging message in the cell, and can gain access from the cell when a service is to be performed. A determining criterion for the terminal device to select a cell as a cell that can be camped on may include the following conditions: 1. The cell is a selected public land mobile network (PLMN), a registered PLMN, or a PLMN in an equivalent PLMN list. 2. The cell is not an access barred cell. 3. Signal quality of the cell meets a cell selection criterion. 4. The cell is a part of a tracking area (TA), and the TA is not one of roaming forbidden TAs. This is not limited in this embodiment of this application. It should be understood that, the initial access includes access that is initiated by the terminal device to establish a radio resource control (RRC) connection to the selected cell. For example, the terminal device needs to request access to the selected cell through random access. In this embodiment of this application, that the cell of the second network device does not support initial access of the terminal device includes that the terminal device cannot request access to the cell of the second network device through random access.

S220. The first network device sends the control information to the terminal device.

Correspondingly, the terminal device receives the control information sent by the first network device.

S230. The terminal device displays a first sign based on the control information, where the first sign is a sign corresponding to a radio access technology used by the second network device.

Specifically, the first network device and the second network device use different radio access technologies, and the terminal device can camp on the cell of the first network device, but cannot camp on the cell of the second network device or cannot access the cell of the second network device. In this case, the first network device may send the terminal device the control information used to indicate the information about the second network device. The terminal device receives the control information, and displays, based on the control information, the first sign corresponding to the radio access technology used by the second network device.

The control information may be NR frequency information of the second network device, or may be NR cell information of the second network device, or may be instruction information used to instruct to display the sign corresponding to the radio access technology used by the second network device. This is not limited in this embodiment of this application. The NR frequency information is used to indicate an NR frequency that can be used by the second network device to provide a service with the first network device in a long term evolution-new radio dual connectivity LTE-NR DC mode. The NR cell information is used to indicate an NR cell that can be used by the second network device to provide a service with the first network device in the LTE-NR DC mode.

It should be understood that, the first network device may be an LTE network device, for example, an eNB, and the second network device may be an NR network device, for example, a gNB. Correspondingly, the cell of the first network device may be an LTE cell, and the cell of the second network device may be an NR cell. This is not limited in this embodiment of this application. It should be further understood that, the first sign may be a 5G sign, or may be an NR sign. This is not limited in this embodiment of this application, either.

In an LTE-NR DC scenario, generally, indication information may be added to an LTE system information block (SIB), to indicate a terminal device that a current network supports LTE-NR DC, so that the terminal device displays an NR sign (or a 5G sign) once detecting the indication information in the SIB. However, that the current network supports LTE-NR DC does not take effect for all terminal devices in the network. Because the SIB is broadcast by an LTE eNB, a terminal device that does not support LTE-NR DC may display the NR sign.

However, in the communication method in this embodiment of this application, the first network device sends the terminal device the control information used to indicate the information about the second network device, so that the terminal device can display, based on the control information, the sign corresponding to the radio access technology used by the second network device. This improves accuracy of displaying the sign of the radio access technology by the terminal device, thereby improving user satisfaction.

In an optional embodiment, the control information is NR frequency information of the second network device or NR cell information of the second network device, the NR frequency information is used to indicate an NR frequency that can be used by the second network device to provide a service with the first network device in a long term evolution-new radio dual connectivity LTE-NR DC mode, and the NR cell information is used to indicate an NR cell that can be used by the second network device to provide a service with the first network device in the LTE-NR DC mode; and that the terminal device displays a first sign based on the control information includes: the terminal device displays the first sign based on the NR frequency information or the NR cell information; or the terminal device displays the first sign based on a capability of the terminal device and the NR frequency information or the NR cell information.

Specifically, the control information may be the NR frequency information of the second network device or the NR cell information of the second network device. In other words, the first network device may notify the terminal device of the NR frequency or the NR cell that can be provided for the terminal device. After receiving the NR frequency information or the NR cell information, the terminal device may directly display the first sign, or may determine whether to display the first sign and display the first sign when determining to display the first sign. In other words, the terminal device may display the first sign based on the NR frequency information or the NR cell information, or the terminal device may display the first sign based on the capability of the terminal device and the NR frequency information or the NR cell information. This is not limited in this embodiment of this application.

It should be understood that, the NR frequency information may include frequency configuration information, reference signal configuration information, and the like. The NR frequency indicated by the NR frequency information may correspond to one or more NR cells. This is not limited in this embodiment of this application. The NR cell information may include frequency information of the NR cell, and may further include cell identification information of the NR cell, reference signal configuration information of the NR cell, and the like. This is not limited in this embodiment of this application, either.

In a possible implementation, the first network device sends the NR frequency information or the NR cell information to the terminal device. After receiving the NR frequency information or the NR cell information, the terminal device displays the first sign. Specifically, after receiving the NR frequency information or the NR cell information sent by the first network device, an access stratum of the terminal device may instruct a higher layer of the terminal device to display the first sign.

In another possible implementation, the first network device sends the NR frequency information or the NR cell information to the terminal device. After receiving the NR frequency information or the NR cell information, the terminal device needs to determine whether to display the first sign. The terminal device displays the first sign only when the terminal device determines that the first sign can be displayed. It should be understood that, the terminal device may determine, in a plurality of manners, whether the first sign needs to be displayed. This is not limited in this embodiment of this application.

In an optional embodiment, that the terminal device displays the first sign based on a capability of the terminal device and the NR frequency information or the NR cell information includes: the terminal device displays the first sign when the capability of the terminal device supports the NR frequency or the NR cell; or the terminal device displays the first sign when the capability of the terminal device supports operating in the LTE-NR DC mode by using the NR frequency or the NR cell.

Specifically, the terminal device may first determine the capability of the terminal device, to be specific, a frequency that the terminal device can support, and determine whether the terminal device can support the NR frequency or the NR cell. If the terminal device cannot support the NR frequency indicated by the NR frequency information sent by the first network device, or cannot support the NR cell indicated by the NR cell information sent by the first network device (which may be specifically that the terminal device does not support a frequency of the NR cell), the terminal device may not display the first sign. In other words, the terminal device displays the first sign only when the capability of the terminal device supports the NR frequency indicated by the NR frequency information or the capability of the terminal device supports the NR cell indicated by the NR cell information. This improves accuracy of displaying the first sign by the terminal device, thereby improving user satisfaction.

Optionally, after determining the capability of the terminal device, the terminal device may further determine whether the capability of the terminal device supports both an LTE frequency and the NR frequency, to be specific, determine whether the capability of the terminal device supports the LTE-NR DC mode using the NR frequency. If the terminal device cannot support operating in the LTE-NR DC mode by using the NR frequency, the terminal device may not display the first sign. In other words, the terminal device displays the first sign only when the capability of the terminal device supports operating in the LTE-NR DC mode by using the NR frequency. This improves accuracy of displaying the first sign by the terminal device, thereby improving user satisfaction.

Optionally, after determining the capability of the terminal device, the terminal device may further determine whether the capability of the terminal device supports both an LTE frequency and a frequency of the NR cell indicated by the NR cell information. If the terminal device cannot support operating in the LTE-NR DC mode by using the NR cell, the terminal device may not display the first sign. In other words, the terminal device displays the first sign only when the capability of the terminal device supports operating in the LTE-NR DC mode by using the NR cell. This improves accuracy of displaying the first sign by the terminal device, thereby improving user satisfaction.

In an optional embodiment, that the terminal device displays the first sign based on the NR frequency information or the NR cell information includes: the terminal device performs signal measurement on the NR frequency or the NR cell based on the NR frequency information or the NR cell information; and the terminal device displays the first sign based on a measurement result of the signal measurement.

Specifically, the terminal device may obtain, based on the NR frequency information, the NR frequency corresponding to the NR frequency information, or may obtain, based on the NR cell information, the NR cell corresponding to the NR cell information, perform signal measurement on the NR frequency or the NR cell, and display the first sign based on the measurement result of the signal measurement on the NR frequency or the NR cell.

In an optional embodiment, that the terminal device displays the first sign based on a measurement result of the signal measurement includes: the terminal device displays the first sign when the terminal device can detect a signal of the NR frequency or the NR cell; or the terminal device displays the first sign when the terminal device can detect a signal of the NR frequency or the NR cell and quality of the signal of the NR frequency or the NR cell is greater than a first threshold.

Specifically, the terminal device performs signal measurement to determine whether the signal of the NR frequency or the NR cell can be detected, and display the first sign only when the signal of the NR frequency or the NR cell can be detected. Alternatively, the terminal device may display the first sign only when the signal of the NR frequency or the NR cell can be detected and the quality of the signal of the NR frequency or the NR cell is greater than the first threshold. This is not limited in this embodiment of this application. This improves accuracy of displaying the first sign by the terminal device, thereby improving user satisfaction.

It should be understood that, the first threshold may be determined by the terminal device, or may be pre-configured by the first network device for the terminal device. For example, the first network device adds the first threshold to system information sent to the terminal device. Alternatively, when sending the NR frequency information or the NR cell information to the terminal device, the first network device also sends the first threshold to the terminal device. This is not limited in this embodiment of this application.

In an optional embodiment, that the terminal device displays the first sign based on a measurement result of the signal measurement includes: the terminal device displays the first sign based on the measurement result of the signal measurement and the capability of the terminal device.

Specifically, after performing the signal measurement on the NR frequency indicated by the NR frequency information or the NR cell indicated by the NR cell information, the terminal device may further determine, based on the measurement result of the signal measurement and the capability of the terminal device, whether to display the first sign, and display the first sign when determining to display the first sign.

In an optional embodiment, that the terminal device displays the first sign based on the measurement result of the signal measurement and the capability of the terminal device includes: the terminal device displays the first sign when the terminal device can detect a signal of the NR frequency or the NR cell and the capability of the terminal device supports operating in the LTE-NR DC mode by using the NR frequency or the NR cell; or the terminal device displays the first sign when the terminal device can detect a signal of the NR frequency or the NR cell, quality of the signal of the NR frequency or the NR cell is greater than a first threshold, and the capability of the terminal device supports operating in the LTE-NR DC mode by using the NR frequency or the NR cell.

Specifically, the terminal device may determine whether the signal of the NR frequency or the NR cell can be detected, and determine whether the capability of the terminal device can support operating in the LTE-NR DC mode by using the NR frequency or the NR cell. If the terminal device can detect the signal of the NR frequency or the NR cell and the capability of the terminal device can support operating in the LTE-NR DC mode by using the NR frequency or the NR cell, the terminal device displays the first sign. This improves accuracy of displaying the first sign by the terminal device, thereby improving user satisfaction.

Optionally, after detecting the signal of the NR frequency or the NR cell, the terminal device may further determine whether the quality of the signal of the NR frequency or the NR cell is greater than the first threshold. If the quality of the signal of the NR frequency or the NR cell is greater than the first threshold and the capability of the terminal device supports operating in the LTE-NR DC mode by using the NR frequency or the NR cell, the terminal device displays the first sign. This improves accuracy of displaying the first sign by the terminal device, thereby improving user satisfaction.

In conclusion, in this embodiment of this application, a condition that the terminal device needs to meet to display the first sign based on the NR frequency information or the NR cell information sent by the first network device may include at least one of the following conditions:

(1) The capability of the terminal device supports the NR frequency or the NR cell.

(2) The capability of the terminal device supports operating in the LTE-NR DC mode by using the NR frequency or the NR cell.

(3) The terminal device can detect the signal of the NR frequency or the NR cell.

(4) The terminal device can detect the signal of the NR frequency or the NR cell, and the quality of the signal is greater than the first threshold.

When the terminal device meets one or more of the four conditions, the terminal device can display the first sign. It should be understood that, the foregoing lists only several possible implementations, and does not limit the scope of this embodiment of this application. All cases of displaying the first sign based on the NR frequency information or the NR cell information sent by the first network device shall fall within the protection scope of this embodiment of this application.

In an optional embodiment, the NR frequency information is carried in the NR cell information of the second network device.

Specifically, the NR frequency information may be carried in the NR cell information of the second network device. The NR cell information is used to indicate an NR cell that can be used by the second network device to provide a service with the first network device in the LTE-NR DC mode. Therefore, the NR cell information may include a frequency of the NR cell, namely, the NR frequency information. It should be understood that, the NR cell information may indicate one or more NR cells. This is not limited in this embodiment of this application, either.

In an optional embodiment, the control information is carried in system information SI.

Specifically, the first network device may add the control information to system information (SI). Because the system information is broadcast by the first network device, before accessing the first network device, the terminal device may obtain the control information by using the system information, to obtain the information about the second network device, and display the first sign.

In an optional embodiment, the control information is first instruction information, the first instruction information is used to instruct the terminal device to display the first sign, and the control information is carried in any one of the following messages: a random access response message, a random access contention resolution message, a radio resource control RRC connection establishment message, an RRC connection re-establishment message, an RRC connection resume message, and an RRC connection reconfiguration message; and before that the first network device sends the control information to the terminal device, the method further includes: the first network device determines that a service can be provided for the terminal device in an LTE-NR DC mode.

Specifically, the control information may be the first instruction information used to instruct the terminal device to display the first sign. In this case, the terminal device is passively instructed by the first network device to display the first sign according to the instruction of the first network device. In this case, the first network device needs to determine whether a service can be provided for the terminal device in the LTE-NR DC mode. When the first network device can provide a service for the terminal device in the LTE-NR DC mode, the first network device sends the terminal device any one of the following messages carrying the first instruction information: a random access response message, a random access contention resolution message, a radio resource control (RRC) connection establishment message, an RRC connection re-establishment message, an RRC connection resume message, and an RRC connection reconfiguration message.

It should be understood that, the first network device may explicitly instruct the terminal device to display the first sign, or may implicitly instruct the terminal device to display the first sign. To be specific, the first instruction information may be specifically one indicator bit. For example, 1 is used to instruct to display the first sign, and 0 is used to instruct not to display the first sign. Alternatively, the first instruction information may be specifically other information, for example, NR frequency information or NR cell information, of the second network device. After detecting such information, the terminal device may display the first sign. Therefore, the explicit instruction and the implicit instruction are not limited in this embodiment of this application.

In an optional embodiment, the first instruction information is NR cell information of the second network device, and the NR cell information is used to indicate an NR cell that can be used by the second network device to provide a service with the first network device in the LTE-NR DC mode.

In an optional embodiment, the control information is carried in the RRC connection reconfiguration message, and the RRC connection reconfiguration message is used to set the NR cell as an NR secondary cell of the terminal device in the LTE-NR DC mode.

Specifically, the first network device may send the RRC connection reconfiguration message to the terminal device, and the RRC connection reconfiguration message carries the NR cell information. After receiving the RRC connection reconfiguration message, the terminal device sets, based on the NR cell information, the NR cell indicated by the NR cell information as the NR secondary cell of the terminal device in the LTE-NR DC mode, and displays the first sign.

In an optional embodiment, that the first network device determines that a service can be provided for the terminal device in an LTE-NR DC mode includes: the first network device determines, based on at least one piece of the following information, that the service can be provided for the terminal device in the LTE-NR DC mode: service information of the terminal device, bearer information of the terminal device, location information of the terminal device, signal measurement information of the terminal device, and capability information of the terminal device.

Specifically, the first network device may determine whether a service can be provided for the terminal device in the LTE-NR DC mode, based on a plurality of pieces of information, for example, the service information of the terminal device, the bearer information of the terminal device, the location information of the terminal device, the signal measurement information of the terminal device, and the capability information of the terminal device.

The service information of the terminal device and the bearer information of the terminal device may be obtained by the first network device. The location information of the terminal device may be reported by the terminal device, or may be obtained by the first network device through calculation based on a parameter that is used by the terminal device in a random access process. If the location information of the terminal device is reported by the terminal device, the terminal device may report the location information of the terminal device after the random access process is completed. The signal measurement information of the terminal device may be a measurement result that is reported to the first network device by the terminal device after signal measurement performed after the first network device sends the NR frequency or the NR cell to the terminal device. The capability information of the terminal device may be obtained by the first network device from a core network, or may be reported by the terminal device. If the capability information of the terminal device is reported by the terminal device, the terminal device may report the capability information of the terminal device after the random access process is completed. It should be understood that, the first network device may obtain the information in a plurality of manners. This is not limited in this embodiment of this application.

Figure 3:
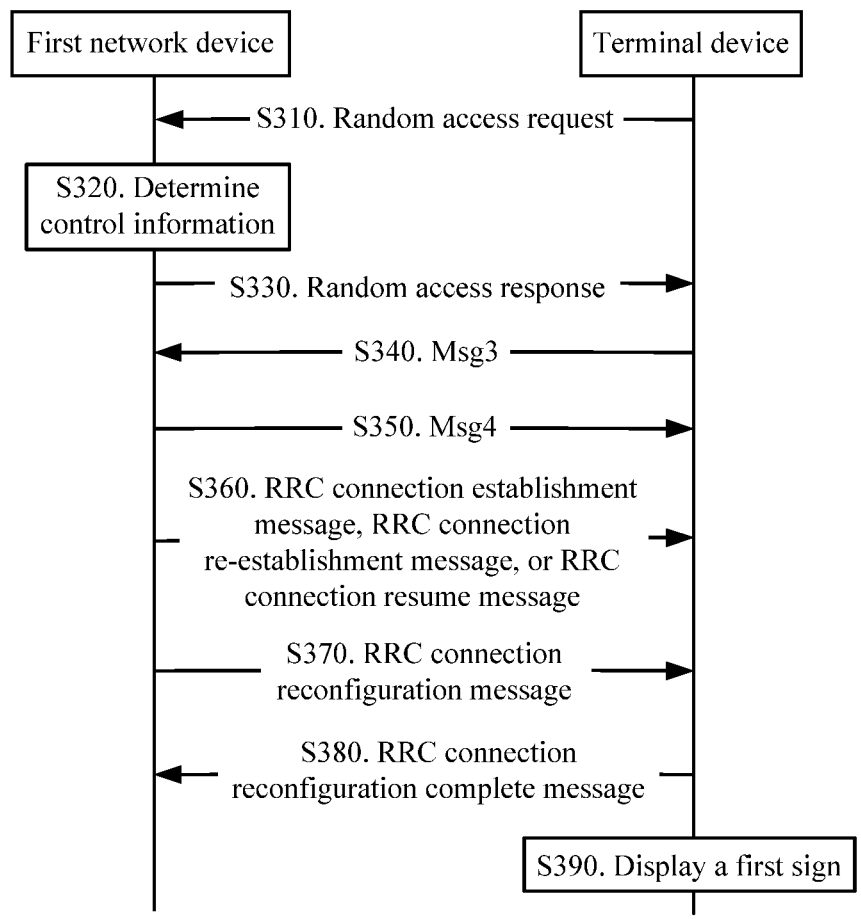
FIG. 3 is a schematic flowchart of another communication method according to an embodiment of this application.

FIG. 3 is a schematic flowchart of a communication method 300 according to an embodiment of this application. The method 300 may be applied to the communications system 100 shown in FIG. 1, but this embodiment of this application is not limited thereto.

S310. A terminal device sends a random access request to a first network device, where the random access request is used to request to access the first network device.

S320. The first network device receives the random access request sent by the terminal device, and determines control information, where the control information is used to indicate information about a second network device, the second network device and the first network device use different radio access technologies, the terminal device camps on a cell of the first network device, and a cell of the second network device does not support camping of the terminal device. Specifically, the control information is first instruction information, used to instruct the terminal device to display a first sign corresponding to a radio access technology used by the second network device.

S330. The first network device sends a random access response to the terminal device. Optionally, in a non-contention-based random access procedure, the random access response may carry the control information.

S390. The terminal device receives the random access response, and displays the first sign after receiving the random access response.

Optionally, in a contention-based random access procedure, the method 300 further includes the following steps:

S340. The terminal device sends a first scheduled uplink transmission message, also referred to as a random access message 3 (Msg 3), to the first network device.

S350. The first network device sends a random access contention resolution message, also referred to as a random access message 4 (Msg 4), to the terminal device. Optionally, the random access contention resolution message may carry the control information.

S390. The terminal device receives the random access contention resolution message, and displays the first sign after receiving the random access contention resolution message.

Optionally, if neither the random access response nor the random access contention resolution message carries the control information, the method 300 further includes the following steps:

S360. The first network device sends an RRC connection establishment message, an RRC connection re-establishment message, or an RRC connection resume message to the terminal device, where the RRC connection establishment message, the RRC connection re-establishment message, or the RRC connection resume message may carry the control information.

S390. The terminal device receives the RRC connection establishment message, the RRC connection re-establishment message, or the RRC connection resume message, and displays the first sign after receiving the RRC connection establishment message, the RRC connection re-establishment message, or the RRC connection resume message.

Optionally, the method 300 further includes the following steps:

S370. The first network device sends an RRC connection reconfiguration message to the terminal device, where the RRC connection reconfiguration message may carry the control information.

S380. The terminal device sends an RRC connection reconfiguration complete message to the first network device.

S390. The terminal device receives the RRC connection reconfiguration message, and displays the first sign after receiving the RRC connection reconfiguration message.

It should be understood that, in this embodiment of this application, the first network device may determine, based on service information of the terminal device, location information of the terminal device, capability information of the terminal device, and the like, whether to instruct the terminal device to display the first sign. Specific implementation is the same as that in the method 100. Details are not described herein again.

It should be further understood that, after receiving the control information sent by the first network device, the terminal device may display the first sign at any moment later than a moment at which the control information is received, or may display the first sign at a specified moment after the control information is received. Specifically, the specified moment may be a specified value preset in a protocol, or may be a specified value determined by the terminal device, or may be a specified value configured by the first network device for the terminal device. This is not limited in this embodiment of this application.

In the communication method in this embodiment of this application, the first network device sends the terminal device the control information used to indicate the information about the second network device, so that the terminal device can display, based on the control information, the sign corresponding to the radio access technology used by the second network device. This improves accuracy of displaying the sign of the radio access technology by the terminal device, thereby improving user satisfaction.

Figure 4:
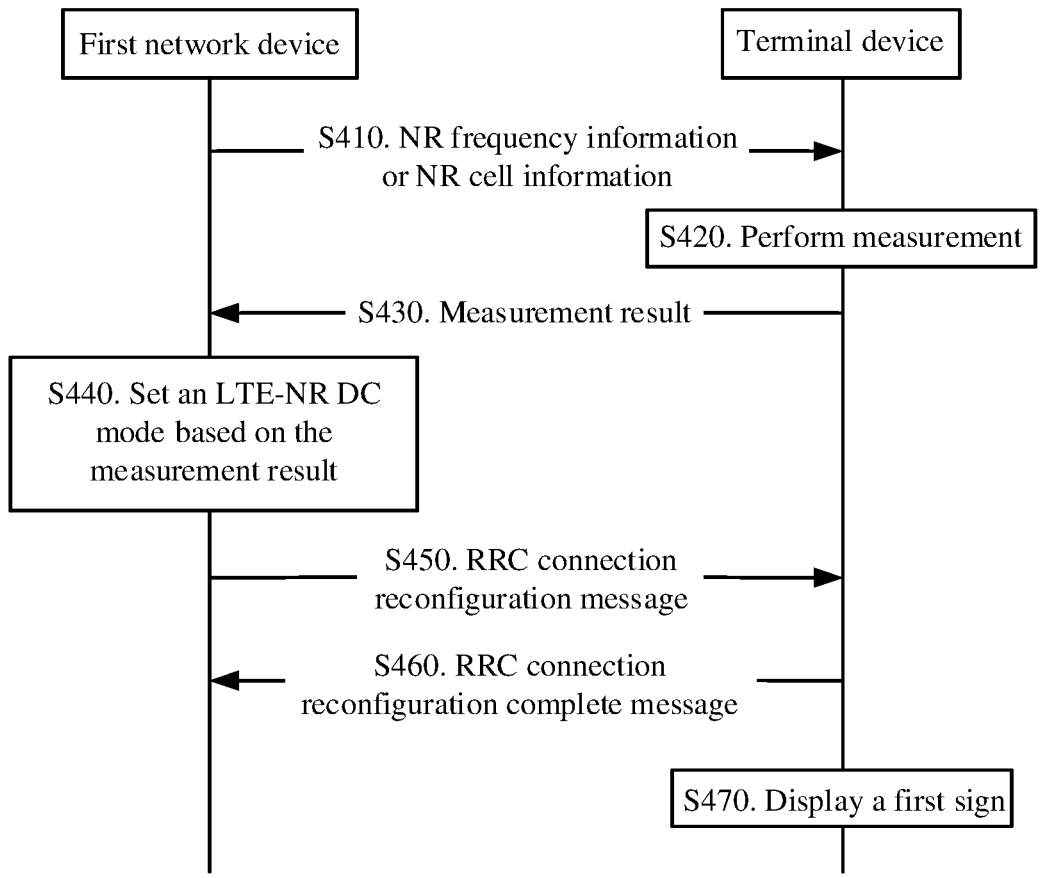
FIG. 4 is a schematic flowchart of another communication method according to an embodiment of this application.

FIG. 4 is a schematic flowchart of a communication method 400 according to an embodiment of this application. The method 400 may be applied to the communications system 100 shown in FIG. 1, but this embodiment of this application is not limited thereto.

S410. A first network device sends NR frequency information or NR cell information to a terminal device. In this case, the terminal device has established an RRC connection to the first network device based on a service requirement.

S420. The terminal device receives the frequency information or the cell information, and performs signal measurement based on the frequency information or the cell information.

Specifically, the frequency information may or may not explicitly indicate that a configured frequency is an NR frequency. Similarly, the cell information may or may not explicitly indicate that a configured cell is an NR cell. This is not limited in this embodiment of this application.

S430. The terminal device sends a measurement result of the signal measurement to the first network device.

S440. The first network device receives the measurement result sent by the terminal device, and determines, based on the measurement result, to set an LTE-NR DC mode for the terminal device to transmit data.

S450. The first network device sends an RRC connection reconfiguration message to the terminal device, where the RRC connection reconfiguration message carries the NR cell information, and the RRC connection reconfiguration message is used to set the NR cell indicated by the NR cell information as an NR secondary cell of the terminal device in the LTE-NR DC mode.

S460. The terminal device receives the RRC connection reconfiguration message, sets the NR cell, and sends an RRC connection reconfiguration complete message to the first network device.

S470. The terminal device displays a first sign.

It should be understood that, S470 may be performed at any moment between S450 and S460, or may be performed after S460. This is not limited in this embodiment of this application. Specifically, when the terminal device receives the RRC connection reconfiguration message, if the terminal device determines that the first network device sets the NR cell or the LTE-NR DC mode for the terminal device to transmit data, the terminal device may start to display the first sign. Alternatively, the terminal device may display the first sign after setting the NR cell, to be specific, when sending the RRC connection reconfiguration complete message to the first network device.

In the communication method in this embodiment of this application, the first network device sends the terminal device control information used to indicate a second network device, so that the terminal device can display, based on the control information, a sign corresponding to a radio access technology used by the second network device. This improves accuracy of displaying the sign of the radio access technology by the terminal device, thereby improving user satisfaction.

It should be understood that, sequence numbers of the foregoing processes do not mean a particular execution sequence. The execution sequence of the processes should be determined based on functions and internal logic of the processes, and should not be construed as any limitation on the implementation processes of the embodiments of this application.

The foregoing describes in detail the communication methods according to the embodiments of this application with reference to FIG. 1 to FIG. 4. The following describes in detail communications apparatuses according to embodiments of this application with reference to FIG. 5 to FIG. 8.

Figure 5:
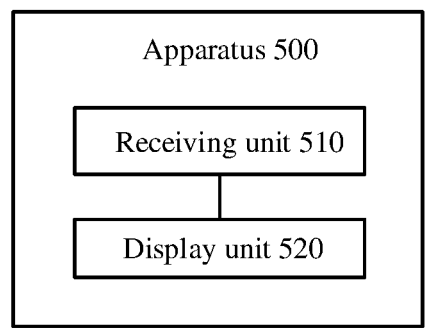
FIG. 5 is a schematic block diagram of a communications apparatus according to an embodiment of this application.

FIG. 5 shows a communications apparatus 500 according to an embodiment of this application. The apparatus 500 includes: a receiving unit 510, configured to receive control information sent by a first network device, where the control information is used to indicate information about a second network device, the second network device and the first network device use different radio access technologies, the apparatus camps on a cell of the first network device, and a cell of the second network device does not support camping of the apparatus or does not support initial access of the apparatus; and a display unit 520, configured to display a first sign based on the control information, where the first sign is a sign corresponding to a radio access technology used by the second network device.

With the communications apparatus in this embodiment of this application, the first network device sends a terminal device the control information used to indicate the second network device, so that the terminal device can display, based on the control information, the sign corresponding to the radio access technology used by the second network device. This improves accuracy of displaying the sign of the radio access technology by the terminal device, thereby improving user satisfaction.

Optionally, the control information is NR frequency information of the second network device or NR cell information of the second network device, the NR frequency information is used to indicate an NR frequency that can be used by the second network device to provide a service with the first network device in a long term evolution-new radio dual connectivity LTE-NR DC mode, and the NR cell information is used to indicate an NR cell that can be used by the second network device to provide a service with the first network device in the LTE-NR DC mode. The display unit 520 is specifically configured to: display the first sign based on the NR frequency information or the NR cell information; or display the first sign based on a capability of the apparatus and the NR frequency information or the NR cell information.

Optionally, the display unit 520 is specifically configured to: display the first sign when the capability of the apparatus supports the NR frequency or the NR cell; or display the first sign when the capability of the apparatus supports operating in the LTE-NR DC mode by using the NR frequency or the NR cell.

Optionally, the display unit 520 is specifically configured to: perform signal measurement on the NR frequency or the NR cell based on the NR frequency information or the NR cell information; and display the first sign based on a measurement result of the signal measurement.

Optionally, the display unit 520 is specifically configured to: display the first sign when a signal of the NR frequency or the NR cell can be detected; or display the first sign when a signal of the NR frequency or the NR cell can be detected and quality of the signal of the NR frequency or the NR cell is greater than a first threshold.

Optionally, the display unit 520 is specifically configured to: display the first sign based on the measurement result of the signal measurement and the capability of the apparatus.

Optionally, the display unit 520 is specifically configured to: display the first sign when a signal of the NR frequency or the NR cell can be detected and the capability of the apparatus supports operating in the LTE-NR DC mode by using the NR frequency or the NR cell; or display the first sign when a signal of the NR frequency or the NR cell can be detected, quality of the signal of the NR frequency or the NR cell is greater than a first threshold, and the capability of the apparatus supports operating in the LTE-NR DC mode by using the NR frequency or the NR cell.

Optionally, the control information is carried in system information SI.

Optionally, the control information is first instruction information, the first instruction information is used to instruct the apparatus to display the first sign, and the control information is carried in any one of the following messages: a random access response message, a random access contention resolution message, a radio resource control RRC connection establishment message, an RRC connection re-establishment message, an RRC connection resume message, and an RRC connection reconfiguration message.

Optionally, the first instruction information is NR cell information of the second network device, and the NR cell information is used to indicate an NR cell that can be used by the second network device to provide a service with the first network device in an LTE-NR DC mode.

Optionally, the control information is carried in the RRC connection reconfiguration message, and the RRC connection reconfiguration message is used to set the NR cell as an NR secondary cell of the apparatus in the LTE-NR DC mode.

Optionally, the first sign is a 5G sign or an NR sign.

It should be understood that, the apparatus 500 herein is embodied in a form of a functional unit. The term "unit" herein may be an application-specific integrated circuit (ASIC), an electronic circuit, a processor (for example, a shared processor, a dedicated processor, or a group processor) for executing one or more software or firmware programs, a memory, an integrated logical circuit, and/or another suitable component that supports the described function. In an optional example, a person skilled in the art may understand that, the apparatus 500 may be specifically the terminal device in the foregoing embodiment, and the apparatus 500 may be configured to perform procedures and/or steps corresponding to the terminal device in the foregoing method embodiment. To avoid repetition, details are not described herein again.

Figure 6:
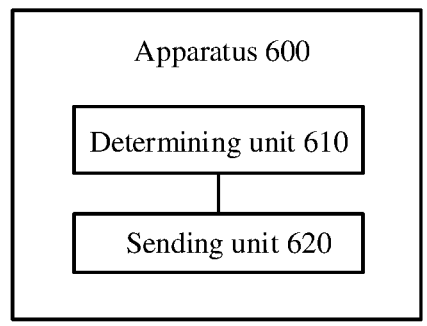
FIG. 6 is a schematic block diagram of another communications apparatus according to an embodiment of this application.

FIG. 6 shows another communications apparatus 600 according to an embodiment of this application. The apparatus 600 includes: a determining unit 610, configured to determine control information, where the control information is used to indicate information about a second network device, the second network device and the apparatus use different radio access technologies, a terminal device camps on a cell of the apparatus, and a cell of the second network device does not support camping of the terminal device or does not support initial access of the terminal device; and a sending unit 620, configured to send the control information to the terminal device.

With the communications apparatus in this embodiment of this application, a first network device sends the terminal device the control information used to indicate the second network device, so that the terminal device can display, based on the control information, a sign corresponding to a radio access technology used by the second network device. This improves accuracy of displaying the sign of the radio access technology by the terminal device, thereby improving user satisfaction.

Optionally, the control information is NR frequency information of the second network device or NR cell information of the second network device, the NR frequency information is used to indicate an NR frequency that can be used by the second network device to provide a service with the apparatus in a long term evolution-new radio dual connectivity LTE-NR DC mode, and the NR cell information is used to indicate an NR cell that can be used by the second network device to provide a service with the apparatus in the LTE-NR DC mode.

Optionally, the control information is carried in system information SI.

Optionally, the control information is first instruction information, the first instruction information is used to instruct the terminal device to display a first sign corresponding to a radio access technology used by the second network device, and the control information is carried in any one of the following messages: a random access response message, a random access contention resolution message, a radio resource control RRC connection establishment message, an RRC connection re-establishment message, an RRC connection resume message, and an RRC connection reconfiguration message; and the determining unit 610 is further configured to: before the control information is sent to the terminal device, determine that a service can be provided for the terminal device in an LTE-NR DC mode.

Optionally, the first instruction information is NR cell information of the second network device, and the NR cell information is used to indicate an NR cell that can be used by the second network device to provide a service with the apparatus in the LTE-NR DC mode.

Optionally, the control information is carried in the RRC connection reconfiguration message, and the RRC connection reconfiguration message is used to set the NR cell as an NR secondary cell of the terminal device in the LTE-NR DC mode.

Optionally, the determining unit 610 is specifically configured to: determine, based on at least one piece of the following information, that the service can be provided for the terminal device in the LTE-NR DC mode: service information of the terminal device, bearer information of the terminal device, location information of the terminal device, signal measurement information of the terminal device, and capability information of the terminal device.

Optionally, the first sign is a 5G sign or an NR sign.

It should be understood that, the apparatus 600 herein is embodied in a form of a functional unit. The term "unit" herein may be an application-specific integrated circuit (ASIC), an electronic circuit, a processor (for example, a shared processor, a dedicated processor, or a group processor) for executing one or more software or firmware programs, a memory, an integrated logical circuit, and/or another suitable component that supports the described function. In an optional example, a person skilled in the art may understand that, the apparatus 600 may be specifically the first network device in the foregoing embodiment, and the apparatus 600 may be configured to perform procedures and/or steps corresponding to the first network device in the foregoing method embodiment. To avoid repetition, details are not described herein again.

Figure 7:
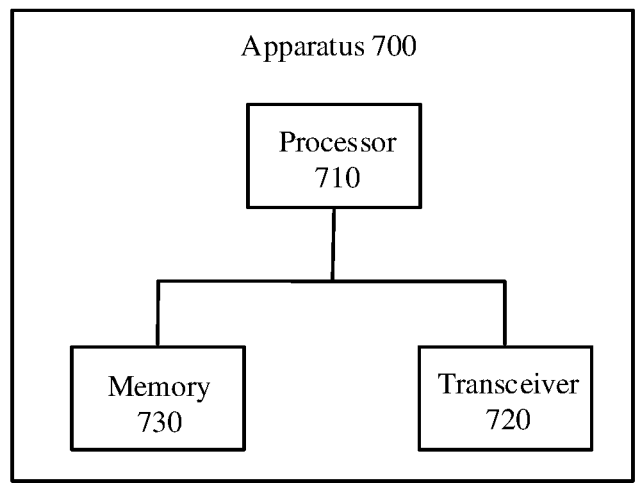
FIG. 7 is a schematic block diagram of another communications apparatus according to an embodiment of this application.

FIG. 7 shows another communications apparatus 700 according to an embodiment of this application. The apparatus 700 includes a processor 710, a transceiver 720, and a memory 730. The processor 710, the transceiver 720, and the memory 730 communicate with each other through an internal connection channel. The memory 730 is configured to store an instruction. The processor 710 is configured to execute the instruction stored in the memory 730, to control the transceiver 720 to send a signal and/or receive a signal.

The transceiver 720 is configured to receive control information sent by a first network device, where the control information is used to indicate information about a second network device, the second network device and the first network device use different radio access technologies, the apparatus camps on a cell of the first network device, and a cell of the second network device does not support camping of the apparatus or does not support initial access of the apparatus. The processor 710 is configured to display a first sign based on the control information, where the first sign is a sign corresponding to a radio access technology used by the second network device.

It should be understood that, the apparatus 700 may be specifically the terminal device in the foregoing embodiment, and may be configured to perform steps and/or procedures corresponding to the terminal device in the foregoing method embodiment. Optionally, the memory 730 may include a read-only memory and a random access memory, and provide an instruction and data for the processor. A part of the memory may further include a non-volatile random access memory. For example, the memory may further store information of a device type. The processor 710 may be configured to execute the instruction stored in the memory. In addition, when the processor 710 executes the instruction stored in the memory, the processor 710 is configured to perform the steps and/or the procedures corresponding to the terminal device in the foregoing method embodiment.

Figure 8:
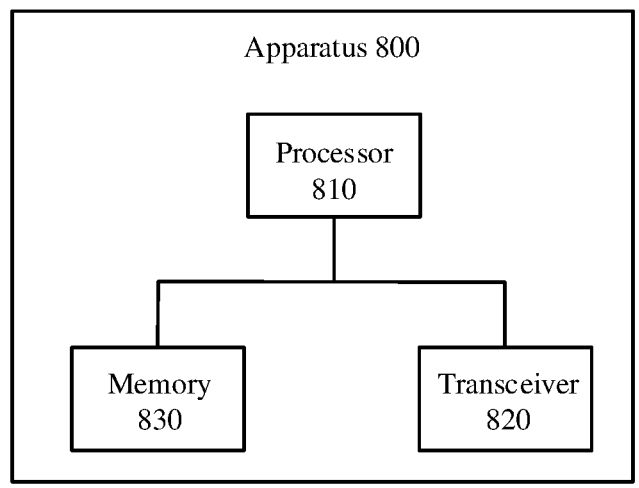
FIG. 8 is a schematic block diagram of another communications apparatus according to an embodiment of this application.

FIG. 8 shows another communications apparatus 800 according to an embodiment of this application. The apparatus 800 includes a processor 810, a transceiver 820, and a memory 830. The processor 810, the transceiver 820, and the memory 830 communicate with each other through an internal connection channel. The memory 830 is configured to store an instruction. The processor 810 is configured to execute the instruction stored in the memory 830, to control the transceiver 820 to send a signal and/or receive a signal.

The processor 810 is configured to determine control information, where the control information is used to indicate information about a second network device, the second network device and the apparatus use different radio access technologies, a terminal device camps on a cell of the apparatus, and a cell of the second network device does not support camping of the terminal device or does not support initial access of the terminal device. The transceiver 820 is configured to send the control information to the terminal device.

It should be understood that, the apparatus 800 may be specifically the first network device in the foregoing embodiment, and may be configured to perform steps and/or procedures corresponding to the first network device in the foregoing method embodiment. Optionally, the memory 830 may include a read-only memory and a random access memory, and provide an instruction and data for the processor. A part of the memory may further include a non-volatile random access memory. For example, the memory may further store information of a device type. The processor 810 may be configured to execute the instruction stored in the memory. In addition, when the processor 810 executes the instruction stored in the memory, the processor 810 is configured to perform the steps and/or the procedures corresponding to the first network device in the foregoing method embodiment.

An embodiment of this application further provides a communications apparatus. The communications apparatus may be a terminal device or may be a circuit. The communications apparatus may be configured to perform an action performed by the terminal device in the foregoing method embodiment.

Figure 9:
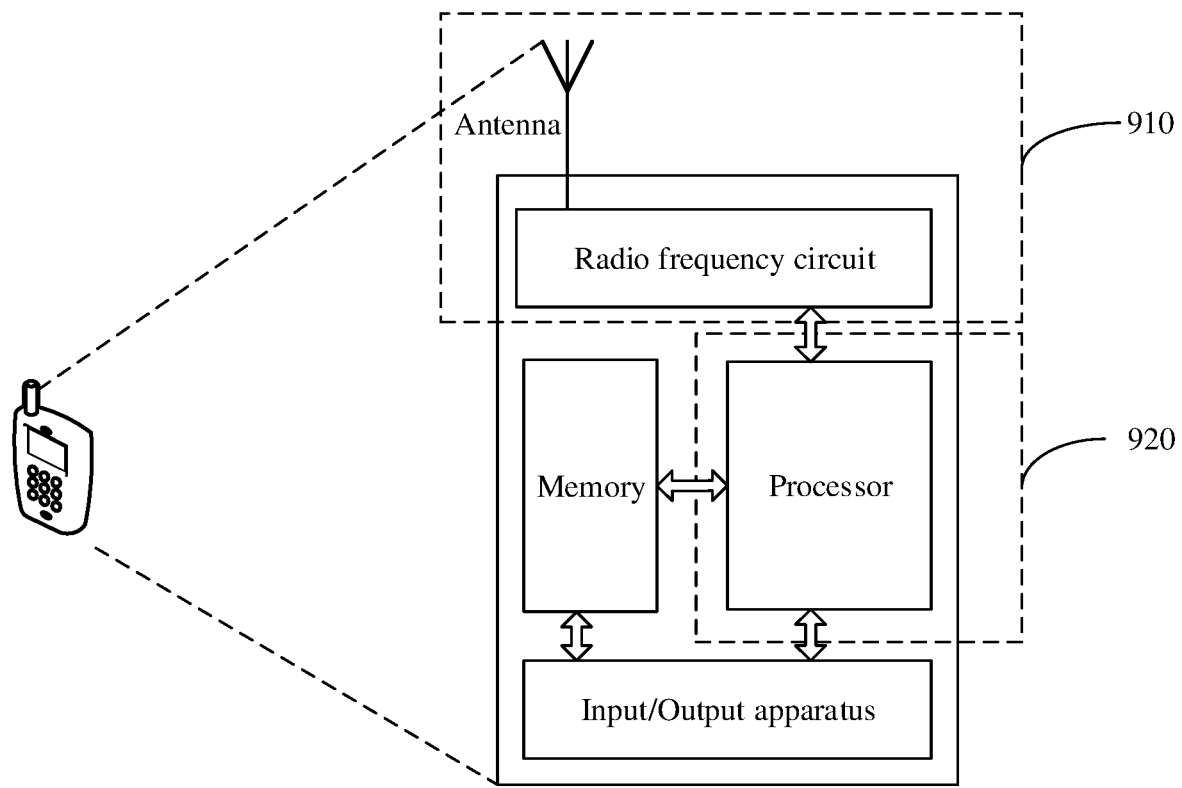
FIG. 9 is a schematic block diagram of another communications apparatus according to an embodiment of this application.

When the communications apparatus is a terminal device, FIG. 9 is a simplified schematic structural diagram of the terminal device. For ease of understanding and illustration, in FIG. 9, a mobile phone is used as an example of the terminal device. As shown in FIG. 9, the terminal device includes a processor, a memory, a radio frequency circuit, an antenna, and an input/output apparatus. The processor is mainly configured to process a communications protocol and communication data, control the terminal device, execute a software program, process data of the software program, and the like. The memory is mainly configured to store the software program and the data. The radio frequency circuit is mainly configured to convert a baseband signal and a radio frequency signal into each other and process the radio frequency signal. The antenna is mainly configured to receive and send radio frequency signals in an electromagnetic wave form. The input/output apparatus, for example, a touchscreen, a display screen, or a keyboard, is mainly configured to receive data input by a user and output data to the user. It should be noted that, some types of terminal devices may not have an input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal to the outside through the antenna in the electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna that has a transceiver function and the radio frequency circuit may be considered as a transceiver unit of the terminal device, and the processor having a processing function may be considered as a processing unit of the terminal device. As shown in FIG. 9, the terminal device includes a transceiver unit 910 and a processing unit 920. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes a receiving unit and a sending unit. The transceiver unit sometimes may also be referred to as a transceiver, a transceiver, a transceiver circuit, or the like. The receiving unit sometimes may also be referred to as a receiver, a receiver, a receive circuit, or the like. The sending unit sometimes may also be referred to as a transmitter, a transmitter, a transmit circuit, or the like.

It should be understood that, the transceiver unit 910 is configured to perform a sending operation and a receiving operation on a terminal device side in the foregoing method embodiment, and the processing unit 920 is configured to perform an operation other than the receiving and sending operations on the terminal device side in the foregoing method embodiment.

For example, in an implementation, the transceiver unit 910 is configured to perform a receiving operation on the terminal device side in step 220 in FIG. 2, and/or the transceiver unit 910 is further configured to perform other receiving and sending steps on the terminal device side in the embodiments of this application. The processing unit 920 is configured to perform step 230 in FIG. 2, and/or the processing unit 920 is further configured to perform another processing step on the terminal device side in the embodiments of this application.

For another example, in another implementation, the transceiver unit 910 is configured to perform a receiving operation or a sending operation on the terminal device side in step 310, step 330, step 340, step 350, step 360, step 370, and step 380 in FIG. 3, and/or the transceiver unit 920 is further configured to perform other receiving and sending steps on the terminal device side in the embodiments of this application. The processing unit 920 is configured to perform step 390 in FIG. 3, and/or the processing unit 920 is further configured to perform another processing step on the terminal device side in the embodiments of this application.

For still another example, in still another implementation, the transceiver unit 910 is configured to perform a receiving operation or a sending operation on the terminal device side in step 410, step 430, step 450, and step 460 in FIG. 4, and/or the transceiver unit 910 is further configured to perform other receiving and sending steps on the terminal device side in the embodiments of this application. The processing unit 920 is configured to perform step 420 and step 470 in FIG. 4, and/or the processing unit 920 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 10:
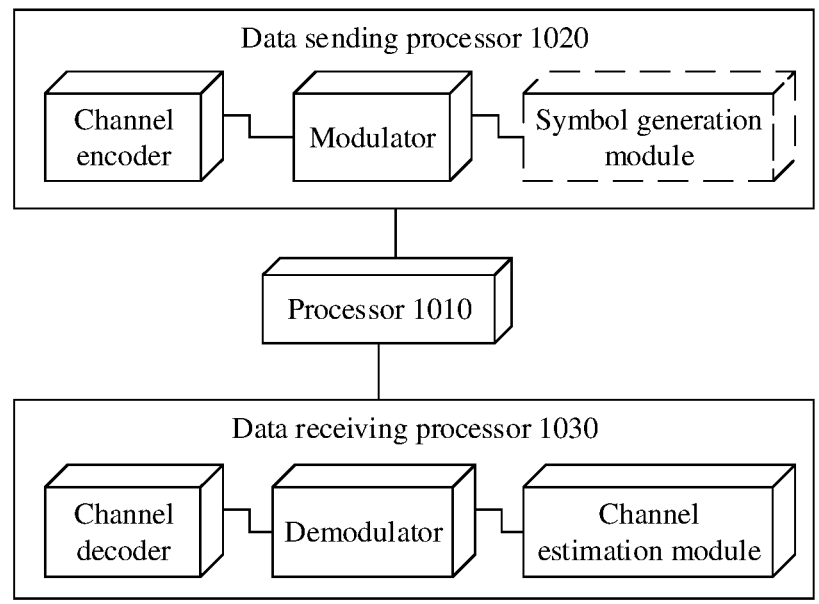
FIG. 10 is a schematic block diagram of another communications apparatus according to an embodiment of this application.

When the communications apparatus in this embodiment is a terminal device, refer to a device shown in FIG. 10. In an example, the device may complete a function similar to that of the processor 710 in FIG. 7. In FIG. 10, the device includes a processor 1010, a data sending processor 1020, and a data receiving processor 1030. The display unit 520 in FIG. 5 may correspond to the processor 1010 in FIG. 10, and complete a corresponding function. The receiving unit 510 in FIG. 5 may correspond to the data receiving processor 1030 in FIG. 10. Although FIG. 10 shows a channel encoder and a channel decoder, it may be understood that these modules do not constitute a limitative description of this embodiment, but are only an example.

Figure 11:
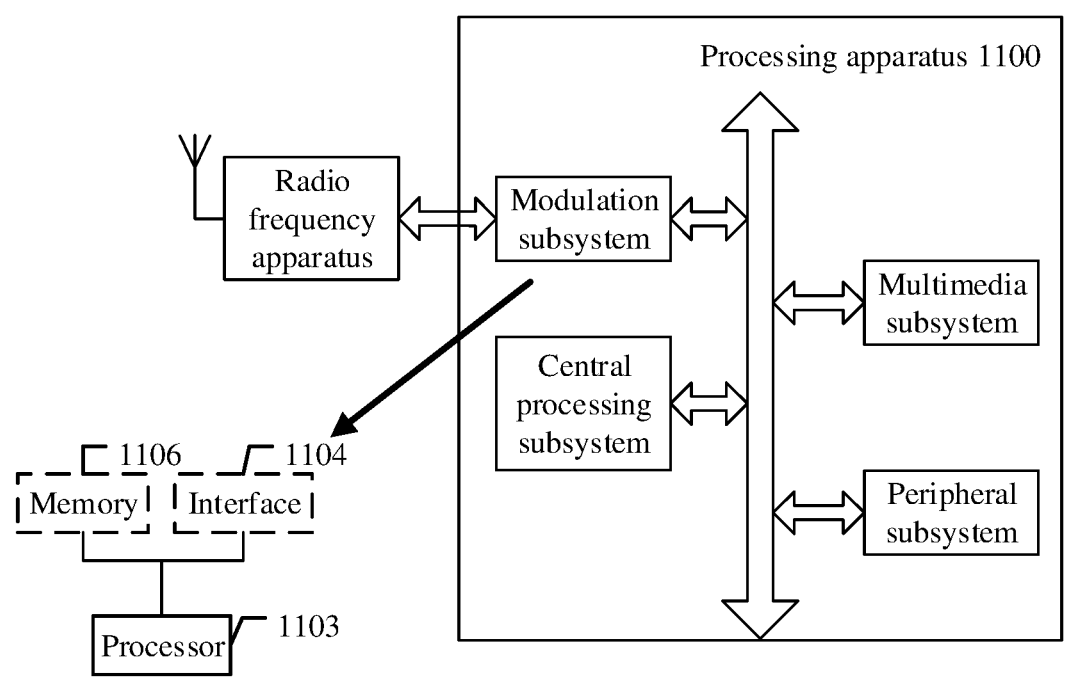
FIG. 11 is a schematic block diagram of another communications apparatus according to an embodiment of this application.

FIG. 11 shows another form of this embodiment. A processing apparatus 1100 includes modules such as a modulation subsystem, a central processing subsystem, and a peripheral subsystem. The communications apparatus in this embodiment may serve as the modulation subsystem therein. Specifically, the modulation subsystem may include a processor 1103 and an interface 1104. The processor 1103 completes a function of the processing module 710. The interface 1104 completes a function of the receiving unit and/or the sending unit. In another variant, the modulation subsystem includes a memory 1106, a processor 1103, and a program stored in the memory 1106 and capable of running on the processor. The processor 1103 implements the method on the terminal device side in the foregoing method embodiment when executing the program. It should be noted that the memory 1106 may be non-volatile or may be volatile, and may be located inside the modulation subsystem or in the processing apparatus 1100, as long as that the memory 1106 can be connected to the processor 1103.

In another form of this embodiment, a computer-readable storage medium is provided. The computer-readable storage medium stores an instruction. The method on the terminal device side in the foregoing method embodiment is performed when the instruction is executed.

In another form of this embodiment, a computer program product including an instruction is provided. The method on the terminal device side in the foregoing method embodiment is performed when the instruction is executed.

It should be understood that in the embodiments of this application, the processor in the foregoing apparatus may be a central processing unit (CPU), or the processor may be another general-purpose processor, a digital signal processor (DSP), an application-specific integrated circuit (ASIC), a field programmable gate array (FPGA) or another programmable logic device, discrete gate or transistor logic device, discrete hardware component, or the like. The general-purpose processor may be a microprocessor, or the processor may be any conventional processor or the like.

It should be further understood that the memory mentioned in the embodiments of the present invention may be a volatile memory or a non-volatile memory, or may include both a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that, when the processor is the general-purpose processor, the DSP, the ASIC, the FPGA or another programmable logic device, the discrete gate or the transistor logic device, or the discrete hardware component, the memory (storage module) is integrated into the processor.

It should be noted that the memory described in this specification includes, but is not limited to, these memories and any other appropriate type of memory.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the steps in the foregoing methods in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, control information sent by a first network device, wherein the control information is new radio (NR) frequency information of a second network device or NR cell information of the second network device, the NR frequency information indicates an NR frequency that is usable by the second network device to provide a service with the first network device in a long term evolution-new radio dual connectivity (LTE-NR DC) mode, the NR cell information indicates an NR cell that is usable by the second network device to provide a service with the first network device in the LTE-NR DC mode, the second network device and the first network device use different radio access technologies, the terminal device camps on a cell of the first network device when the control information is received, and a cell of the second network device does not support camping of the terminal device or does not support initial access of the terminal device;
   determining, by the terminal device, whether the NR frequency or the NR cell is accessible by the terminal device;
   determining, by the terminal device, whether a capability of the terminal device supports operating in the LTE-NR DC mode with the NR frequency or the NR cell; and
   displaying, by the terminal device, a first sign based on determining whether the NR frequency or the NR cell is accessible by the terminal device and determining whether the capability of the terminal device supports operating in the LTE-NR DC mode with the NR frequency or the NR cell, wherein the first sign corresponds to a radio access technology used by the second network device.

2. The method according to claim 1, wherein determining, by the terminal device, whether the NR frequency or the NR cell is accessible by the terminal device comprises:
   performing, by the terminal device, signal measurement on the NR frequency or the NR cell based on the NR frequency information or the NR cell information; and
   determining, by the terminal device, whether the NR frequency or the NR cell is accessible by the terminal device based on a measurement result of the signal measurement.

3. The method according to claim 2, wherein determining, by the terminal device, whether the NR frequency or the NR cell is accessible by the terminal device further comprises:
   determining, by the terminal device, that the NR frequency or the NR cell is accessible by the terminal device in response to the terminal device detecting a signal of the NR frequency or the NR cell; or
   determining, by the terminal device, that the NR frequency or the NR cell is accessible by the terminal device in response to the terminal device detecting a signal of the NR frequency or the NR cell, and quality of the signal of the NR frequency or the NR cell being greater than a first threshold.

4. The method according to claim 1, wherein displaying, by the terminal device, the first sign based on determining whether the NR frequency or the NR cell is accessible by the terminal device and determining whether the capability of the terminal device supports operating in the LTE-NR DC mode with the NR frequency or the NR cell comprises:

displaying, by the terminal device, the first sign in response to the terminal device detecting a signal of the NR frequency or the NR cell, and the capability of the terminal device supporting operating in the LTE-NR DC mode using the NR frequency or the NR cell; or displaying, by the terminal device, the first sign in response to the terminal device detecting a signal of the NR frequency or the NR cell, quality of the signal of the NR frequency or the NR cell being greater than a first threshold, and the capability of the terminal device supporting operating in the LTE-NR DC mode using the NR frequency or the NR cell.

5. The method according to claim 1, wherein the control information is carried in a radio resource control (RRC) connection reconfiguration message, and the RRC connection reconfiguration message instructs to set the NR cell as an NR secondary cell of the terminal device in the LTE-NR DC mode.

6. An apparatus, comprising:

a receiver, configured to receive control information sent by a first network device, wherein control information is new radio (NR) frequency information of a second network device or NR cell information of the second network device, the NR frequency information indicates an NR frequency that is usable by the second network device to provide a service with the first network device in a long term evolution-new radio dual connectivity (LTE-NR DC) mode, the NR cell information indicates an NR cell that is usable by the second network device to provide a service with the first network device in the LTE-NR DC mode, the second network device and the first network device are configured to use different radio access technologies, the apparatus is configured to be camping on a cell of the first network device when the control information is received, and a cell of the second network device does not support camping of the apparatus or does not support initial access of the apparatus;

determining whether the NR frequency or the NR cell is accessible by the apparatus;

determining whether a capability of the apparatus supports operating in the LTE-NR DC mode with the NR frequency or the NR cell; and a display, configured to display a first sign based on determining whether the NR frequency or the NR cell is accessible by the apparatus and determining whether the capability of the apparatus supports operating in the LTE-NR DC mode with the NR frequency or the NR cell, wherein the first sign corresponds to a radio access technology used by the second network device.

7. The apparatus according to claim 6, wherein determining whether the NR frequency or the NR cell is accessible by the apparatus comprises:

performing signal measurement on the NR frequency or the NR cell based on the NR frequency information or the NR cell information.

8. The apparatus according to claim 7, wherein determining whether the NR frequency or the NR cell is accessible by the apparatus further comprises:

determining that the NR frequency or the NR cell is accessible by the apparatus in response to a signal of the NR frequency or the NR cell being detected; or determining that the NR frequency or the NR cell is accessible by the apparatus in response to a signal of the NR frequency or the NR cell being detected and quality of the signal of the NR frequency or the NR cell being greater than a first threshold.

9. The apparatus according to claim 6, wherein displaying the first sign based on determining whether the NR frequency or the NR cell is accessible by the apparatus and determining whether the capability of the apparatus supports operating in the LTE-NR DC mode with the NR frequency or the NR cell comprises:

displaying the first sign in response to a signal of the NR frequency or the NR cell being detected and the capability of the apparatus supporting operating in the LTE-NR DC mode using the NR frequency or the NR cell; or displaying the first sign in response to a signal of the NR frequency or the NR cell being detected, quality of the signal of the NR frequency or the NR cell being greater than a first threshold, and the capability of the apparatus supporting operating in the LTE-NR DC mode using the NR frequency or the NR cell.

10. The apparatus according to claim 6, wherein the control information is carried in a radio resource control (RRC) connection reconfiguration message, and the RRC connection reconfiguration message instructs to set the NR cell as an NR secondary cell of the apparatus in the LTE-NR DC mode.

11. An apparatus, comprising:

a processor, configured to:

determine control information, wherein the control information indicates control information is new radio (NR) frequency information of a second network device or NR cell information of the second network device, the NR frequency information indicates an NR frequency that is usable by the second network device to provide a service with the apparatus in a long term evolution-new radio dual connectivity (LTE-NR DC) mode, the NR cell information indicates an NR cell that is usable by the second network device to provide a service with the apparatus in the LTE-NR DC mode, the second network device and the apparatus are configured to use different radio access technologies, a terminal device camps on a cell of the apparatus when the control information is determined, and a cell of the second network device does not support camping of the terminal device or does not support initial access of the terminal device; and a transmitter, configured to send the control information to the terminal device, causing the terminal device to determine whether the NR frequency or the NR cell is accessible by the terminal device, to determine whether a capability of the terminal device supports operating in the LTE-NR DC mode with the NR frequency or the NR cell, and to display a first sign based on determining whether the NR frequency or the NR cell is accessible by the terminal device and determining whether the capability of the terminal device supports operating in the LTE-NR DC mode with the NR frequency or the NR cell.

12. The apparatus according to claim 11, wherein the control information is carried in a radio resource control (RRC) connection reconfiguration message, and the RRC connection reconfiguration message instructs to set the NR cell as an NR secondary cell of the terminal device in the LTE-NR DC mode.

\* \* \* \* \*